(12) United States Patent  
Chezzi et al.

(10) Patent No.: US 6,675,684 B2
(45) Date of Patent: Jan. 13, 2004

(54) CUTOFF MACHINE FOR TUBULAR ELEMENTS

(75) Inventors: Aleardo Chezzi, Reggio Emilia (IT); Mauro Lorenzini, Reggio Emilia (IT)

(73) Assignee: Oto Mills S.p.A., Boretto (Reggio Emilia) (IT)

( * ) Notice: Subject to any disclaimer, the term of this patent is extended or adjusted under 35 U.S.C. 154(b) by 93 days.

(21) Appl. No.: 09/888,573

(22) Filed: Jun. 26, 2001

(65) Prior Publication Data

US 2002/0112584 A1 Aug. 22, 2002

(30) Foreign Application Priority Data

Feb. 20, 2001 (IT) .................................... MO2001A0029

(51) Int. Cl.⁷ .............................................. B23D 21/00
(52) U.S. Cl. ........................................ 83/319; 83/466.1
(58) Field of Search ................................ 83/466.1, 298, 83/301, 862, 864, 883, 300, 303, 319, 454, 456, 668, 683, 54

(56) References Cited

U.S. PATENT DOCUMENTS

| | | | | | |
|---|---|---|---|---|---|
| 2,741,309 A | * | 4/1956 | Czarnik | .................. | 83/247 |
| 3,129,624 A | * | 4/1964 | Auer | ...................... | 83/300 |
| 3,596,549 A | * | 8/1971 | Miyazaki | ................. | 83/292 |
| 3,867,857 A | * | 2/1975 | Tominaga | ................. | 83/14 |
| 3,938,415 A | * | 2/1976 | Borzym | .................... | 83/385 |
| 4,055,100 A | * | 10/1977 | Borzym | .................... | 83/319 |
| 4,108,029 A | * | 8/1978 | Borzym | .................... | 83/300 |
| 4,294,147 A | * | 10/1981 | Borzym | .................... | 269/235 |
| 4,337,680 A | * | 7/1982 | Borzym | .................... | 83/319 |
| 4,457,200 A | * | 7/1984 | Borzym | .................... | 83/319 |
| 4,563,927 A | * | 1/1986 | Kinsley | ................... | 83/319 |
| 4,624,168 A | * | 11/1986 | Borzym | .................... | 83/319 |
| 4,669,348 A | * | 6/1987 | Holder | ..................... | 83/452 |
| 4,823,579 A | * | 4/1989 | Castricum | ............... | 72/49 |
| 5,383,381 A | * | 1/1995 | Graham | .................... | 83/320 |
| 5,690,011 A | * | 11/1997 | Hill et al. | ................ | 83/319 |

* cited by examiner

Primary Examiner—Paul T. Sewell
Assistant Examiner—Nini F. Legesse
(74) Attorney, Agent, or Firm—Browdy and Neimark

(57) ABSTRACT

The machine comprises a scoring tool, which makes a first surface incision tangentially of a tubular element, and a blade for making a full cut starting from the surface incision, the machine being characterized in that it comprises means for autonomously commanding and guiding a working cycle of the scoring tool and also comprises distinct means for autonomously commanding and guiding a working cycle of the blade.

7 Claims, 3 Drawing Sheets

CUTOFF MACHINE FOR TUBULAR ELEMENTS

BACKGROUND OF THE INVENTION

1. Technical Field of the Invention

Specifically, though not exclusively, the cutoff machine is useful for "running" cuts effected on tubular elements produced by continuous cold-forming on motorized and non-motorized rollers.

2. Prior Art

Among known and used cutting systems there is a system known as "dimple-free" which consists in using two tools whose movements are mechanically constrained one to the other. One of these is a scoring tool, which makes a first incision tangentially to the tubular element, while the other is a cutter or blade, which makes the full cut, starting from the incision made by the scorer. The mechanical constraint between the two tools is rigid in the sense that they are both part of a same mechanism. Thanks to this unified mechanism the movements of the two tools are determined one in function of the other, i.e. a determined position of one always corresponds to an equally-determined relative position of the other).

A mechanism transforms the non-active vertical movement of the cutting tool into the active part, i.e. the working run, of the scoring tool, which run is perpendicular to the vertical movement of the cutting tool. The order of operations is thus: the scoring tool removes the superficial part of the tubular element, immediately following which the cutting tool penetrates into the score made by the scoring tool and performs the complete cut. Throughout the operation the tubular element is clamped by little vises which are specially activated for the purpose.

These machines however have some drawbacks which heavily compromise their use.

The operation of the two tools is fixed, independently of the size and material of the elements to be cut (the cutter run-cycle is of fixed entity). This means that the cutting cycle times are not adaptable, in economically viable terms, to situations where the elements to be cut have varying characteristics (size, materials).

The main aim of the present invention is to provide a cutoff machine for tubular elements which can overcome the above-mentioned drawbacks in the prior art.

More specifically, the main aim of the present invention is to optimize the removal of material by the scoring tool independently of the operation speed of the cutter.

A further aim is to increase considerably the working life of the scoring tool.

A further aim is to make the element cutting time proportional to the size of the workpiece element without changing the cutting tool speed.

An advantage of the invention is constituted by the considerable operational flexibility of the cutting tool.

SUMMARY OF THE INVENTION

The machine comprises a scoring tool, which makes a first surface incision tangentially of a tubular element, and a blade for making a full cut starting from the surface incision, the machine being characterised in that it comprises means for autonomously commanding and guiding a working cycle of the scoring tool and also comprises distinct means for autonomously commanding and guiding a working cycle of the blade.

BRIEF DESCRIPTION OF THE DRAWINGS

These aims and advantages and others besides are all achieved by the present invention, as it is characterised in the claims that follow.

Further advantages of the present invention will better emerge from the detailed description that follows of a preferred but non-exclusive embodiment of the invention, illustrated purely by way of non-limiting example in the accompanying figures of the drawings, in which.

DESCRIPTION OF THE PREFERRED EMBODIMENTS

Figure 1:
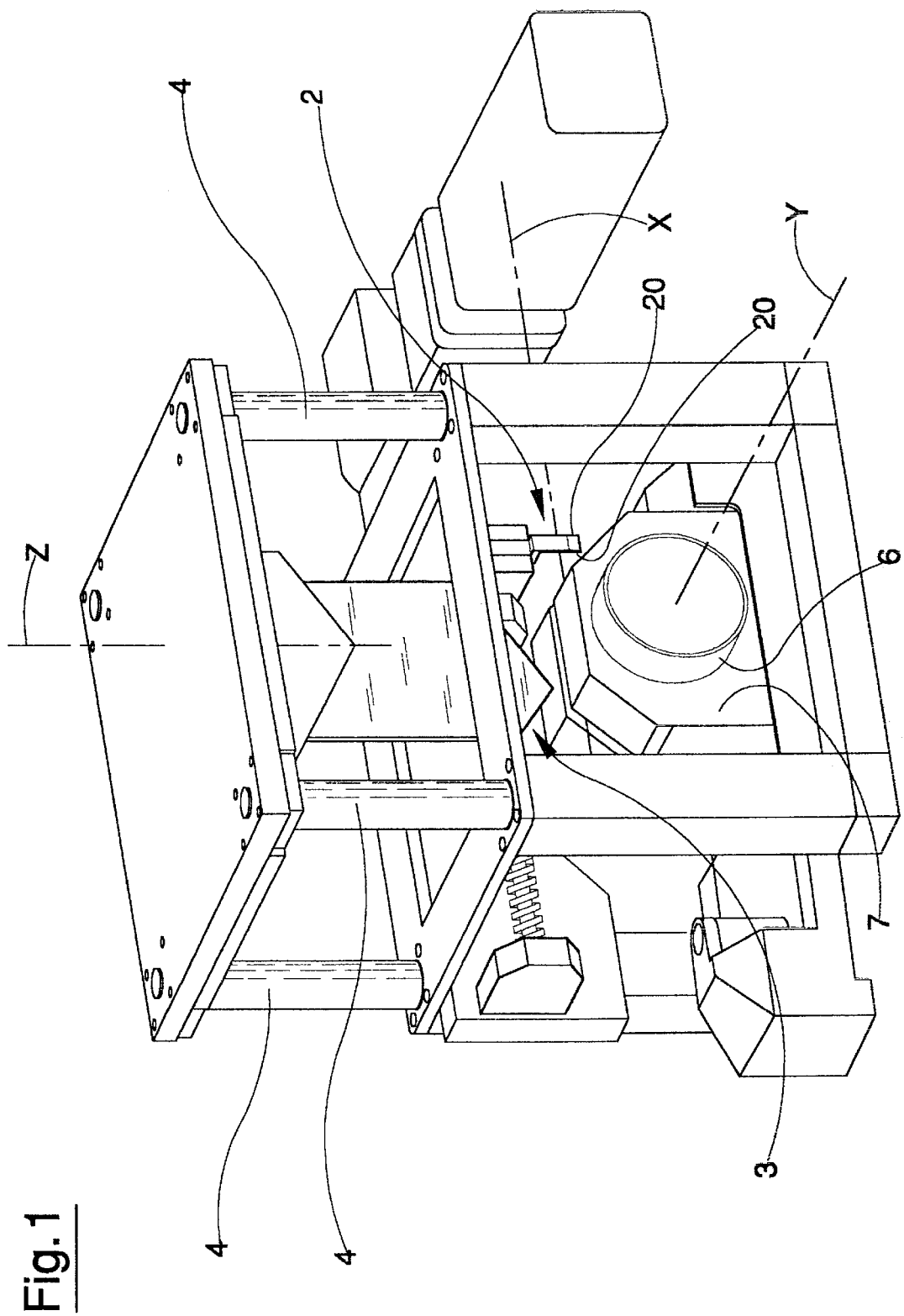
FIG. 1 is a schematic perspective view.
Figure 2:
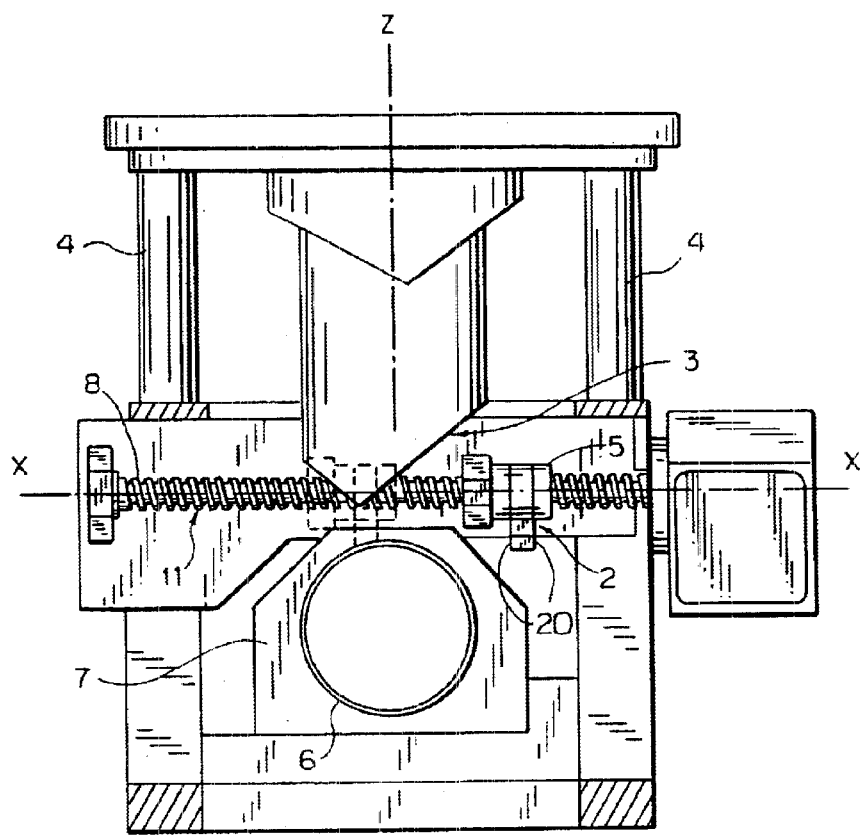
FIG. 2 and FIG. 3 are two frontal views in two different operating configurations.
Figure 3:
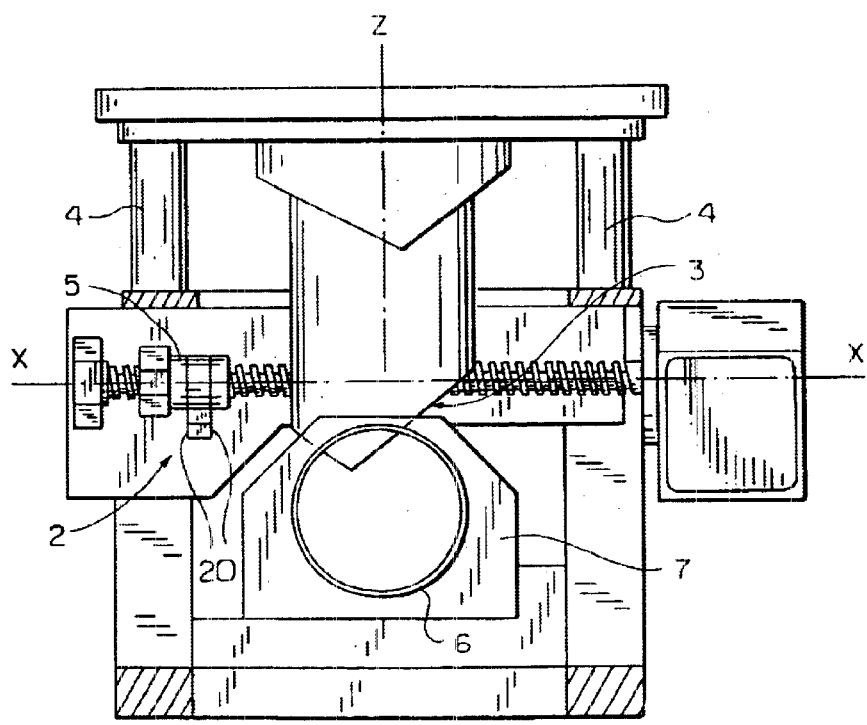

With reference to the figures of the drawings, 1 denotes in its entirety a mobile cuttoff machine for tubular elements, which is mounted in a production line (not illustrated) of tubular elements 6 made by continuous cold-forming by special roller-forming machines.

The mobile cutoff machine 1 illustrated employs a scoring tool 2 for making a first incision tangentially on the element, and a blade 3 for making the actual deep cut starting from the score made by the scoring tool 2.

During these operations the element 6 is held solidly gripped by the vises 7 which remain active for the time strictly necessary for completing the total cut. The cutoff machine 1 is characterized by the fact that it comprises means for autonomously commanding and guiding the working run-cycle of the scoring tool 2 as well as distinct means for autonomously commanding and guiding the working run-cycle of the blade 3.

In particular, the means for autonomously commanding and guiding the working run of the scoring tool 2 comprise an autonomous actuator, which produces a working run-cycle consisting in a translation in both directions along a first predetermined axis, denoted by x, which, in the example, is horizontal and perpendicular to the longitudinal axis of the element 6, denoted by y (which coincides with the axis of advancement of the element 6).

The blade 3 is guided autonomously to translate in a vertical direction by the columns 4 and moved by a press mechanism characterized by a rotating shaft 12 which causes the blade 3 to move along a second axis, indicated by z, which is perpendicular to the axis x.

In this illustrated embodiment, the actuator moving and guiding the scoring tool 2 comprises a headstock 5 which moves along the first axis x driven by a ball-bearing-screw coupling.

Figure 4:
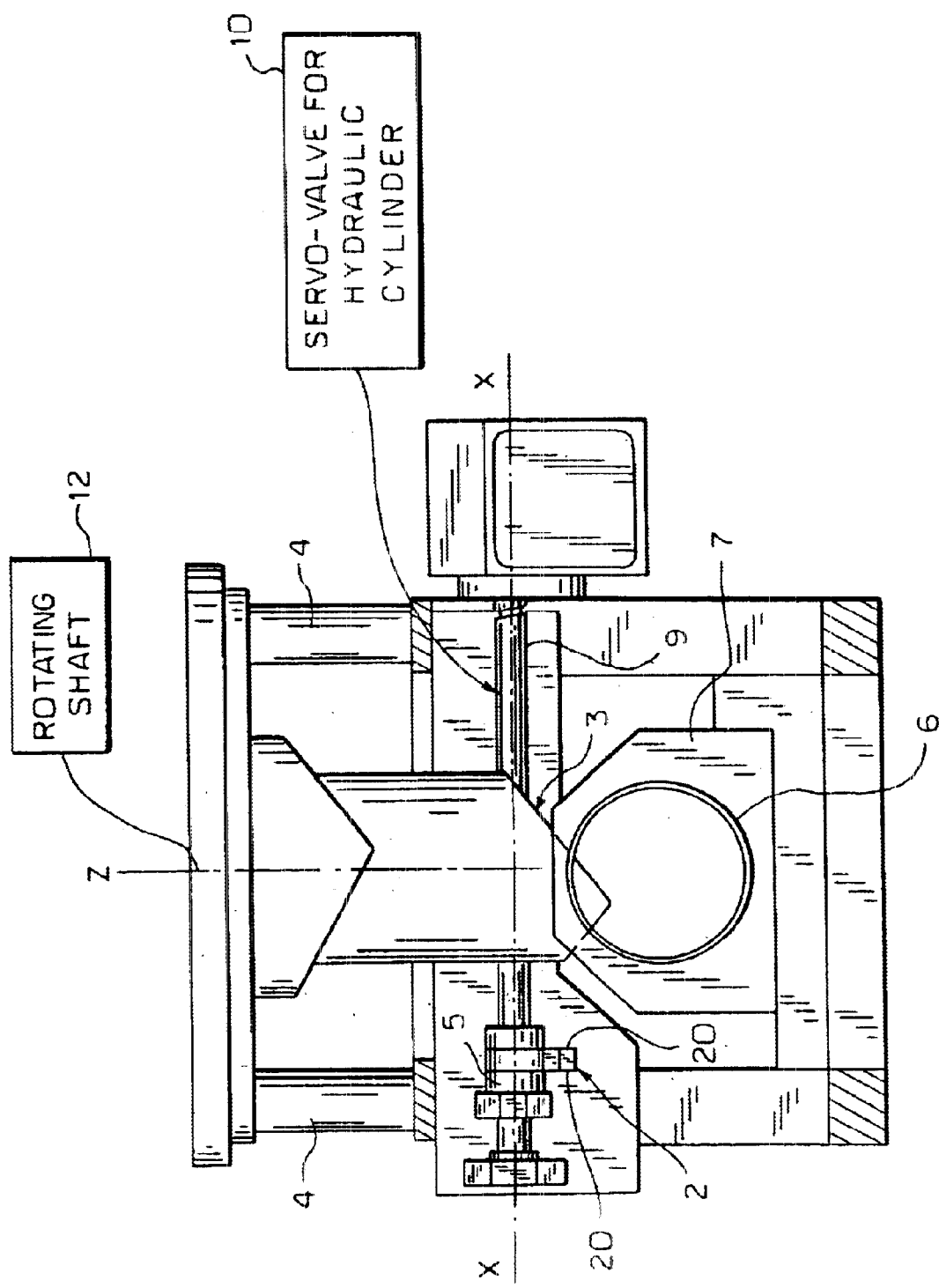
FIG. 4 shows alternative actuators for that shown in FIGS. 1–3.

Further embodiments of the invention illustrated in FIG. 4, provide for use of a similar headstock driven along axis x by either a rack-and-pinion mechanism or a hydraulic cylinder specially dimensioned so that the high-pressure oil chamber is small, thus reducing the problem of oscillation due to oil compressibility. The cylinder is actuated through a closed-circuit servo-valve 10 which can achieve movement through controlled inertia forces.

The scoring tool 2 is preferably symmetrical with respect to a vertical plane perpendicular to the first axis x inasmuch as it exhibits, symmetrically with respect to the vertical plane, two scorers 20, one of which operates in the work motion direction, the other in the opposite direction.

This symmetrical arrangement of the scorers 20 on the scoring tool 2 means that in a simple run-cycle (i.e. in both directions) the tool can score twice, with an obvious gain in terms of time and a doubling of the working life of the tool itself with respect to machines equipped with only one active cutting side and in which, obviously, a cutting cycle involves an empty return run.

This ability to cut in both run directions enables the cutting cycle time to be reduced to a minimum, because it eliminates some dead times (the return cycle).

Furthermore the independence of the scoring tool 2 from the blade 3 means that the cutting parameters can be optimized independently for each of the tools.

In particular, the independent motion of the blade 3 means that the blade 3 itself can be positioned variably according to the dimensions of the tubular element 6, maintaining the start cut position (i.e. the start position of the active run of the tool) at a fixed distance from the highest point of any tubular element. In the work cycle of a moving cutoff machine, it will therefore be possible to reduce the time spent synchronised at element-advancement speed, equal to the cutting time, allowing the blade 3 to re-position itself for following stages (inversion of the truck, return etc.)

The cutting time cycle can therefore be optimized and calibrated according to the particular dimensions of the elements to be cut. It is therefore possible to use a same cutoff machine both for small elements with high-speed cutting times, i.e with short cutting time requirements, and for large-size elements requiring a proportionally longer cycle; there is no need to change the machine configuration.

What is claimed:

1. A cutoff machine for tubular elements, comprising a scoring tool, which scoring tool makes a surface incision tangentially of a tubular element, and a blade for making a full cut starting from the first surface incision, the cutoff machine comprising first means for moving and guiding a working cycle of the scoring tool which operate entirely independent and separate from second means for moving and guiding a working cycle of the blade, wherein entire independence of the working cycle of the scoring tool from that of the blade permits optimizing cutting parameters of both the scoring tool and the blade, wherein the first means for moving and guiding a working cycle of the scoring tool comprise an actuator for powering a work cycle consisting in movement in two directions, an outward run and a return run along a predetermined first axis, wherein the surface incision is made in both the outward run and the return run.

2. The cutoff machine of claim 1, wherein the scoring tool is symmetrical with respect to a plane which is perpendicular to the predetermined first axis, exhibiting, in a symmetrical position with regard to the predetermined first axis, two scorers, one of which scores in one run of the working cycle of the scoring tool and another of which scores in another run of the working cycle of the scoring tool.

3. The cutoff machine of claim 1, wherein the second means for moving and guiding the working cycle of the blade move the blade along a second axis which is perpendicular to the predetermined first axis; a start position of the working cycle of the blade being variable according to dimensions of the tubular element.

4. The cutoff machine of claim 3, wherein the second means for moving and guiding the working cycle of the blade allow for an adjustment of a start-cut position of the blade, which corresponds to a start position of an active run of the blade, in accordance with transversal dimensions of the elements, thus locating the blade at a fixed distance from the elements.

5. The cutoff machine of claim 1, wherein the actuator comprises a headstock which can move along the predetermined first axis, driven by a ball-screw coupling.

6. The cutoff machine of claim 1, wherein the actuator comprises a headstock which can move along the predetermined first axis, driven by a rack-and-pinion mechanism.

7. The cutoff machine of claim 1, wherein the actuator comprises a hydraulic cylinder equipped with a small high-pressure oil chamber able to reduce problems connected with oscillation due to oil compressibility; the cylinder being controlled by means of a closed-circuit servo-valve which can achieve controlled-force movements.

\* \* \* \* \*